(12) United States Patent  
Kleiveland et al.

(10) Patent No.: US 11,820,705 B2  
(45) Date of Patent: Nov. 21, 2023

(54) APPARATUS AND METHOD FOR CONTROLLING A QUANTITY OF BINDER RESIN THAT FOLLOWS A THREAD

(71) Applicant: Comrod AS, Tau (NO)

(72) Inventors: Joar Kleiveland, Jørpeland (NO); Erlend Sie, Jørpeland (NO)

(73) Assignee: Comrod AS, Tau (NO)

( * ) Notice: Subject to any disclaimer, the term of this patent is extended or adjusted under 35 U.S.C. 154(b) by 438 days.

(21) Appl. No.: 17/281,511

(22) PCT Filed: Oct. 4, 2019

(86) PCT No.: PCT/NO2019/050206  
§ 371 (c)(1),  
(2) Date: Mar. 30, 2021

(87) PCT Pub. No.: WO2020/071923  
PCT Pub. Date: Apr. 9, 2020

(65) Prior Publication Data  
US 2022/0041502 A1  Feb. 10, 2022

(30) Foreign Application Priority Data

Oct. 5, 2018  (NO) .................................. 20181287

(51) Int. Cl.  
*B05C 11/04* (2006.01)  
*B05C 11/02* (2006.01)  
(Continued)

(52) U.S. Cl.  
CPC .............. *C03C 25/20* (2013.01); *C03C 25/24* (2013.01); *D06B 3/04* (2013.01)

(58) Field of Classification Search  
CPC ....... B05C 11/02; B05C 11/021; B05C 11/04; B05C 11/048  
See application file for complete search history.

(56) References Cited

U.S. PATENT DOCUMENTS

| | | | | |
|---|---|---|---|---|
| 1,771,923 A | * | 7/1930 | Hendrickson | .......... D01H 13/04 |
| | | | | 242/157 R |
| 2,868,159 A | * | 1/1959 | Lit | .......................... B05C 3/152 |
| | | | | 118/420 |

(Continued)

FOREIGN PATENT DOCUMENTS

| DE | 3618962 A1 | 12/1987 |
|---|---|---|
| EP | 0990626 | 4/2000 |

(Continued)

OTHER PUBLICATIONS

Norwegian Search Report for 20181287, dated Apr. 24, 2019.  
International Search Report and the Written Opinion for PCT/NO2019/050206, dated Jan. 14, 2020.

*Primary Examiner* — Cachet I Proctor  
(74) *Attorney, Agent, or Firm* — ANDRUS INTELLECTUAL PROPERTY LAW, LLP

(57) ABSTRACT

An apparatus is arranged to control a quantity of binder resin that is carried by a thread, the apparatus comprising at least one first tine row being arranged parallel and displaceably to at least one second tine row, wherein a guide track for the thread is formed transversely to the tine rows and a displacement of at least one tine row the guide track. A method for controlling the quantity of binder resin by using tines is described as well.

14 Claims, 6 Drawing Sheets

(51) Int. Cl.
  *C03C 25/24* (2018.01)
  *C03C 25/20* (2006.01)
  *D06B 3/04* (2006.01)

(56) References Cited

U.S. PATENT DOCUMENTS

| | | | |
|---|---|---|---|
| 2,881,732 A | 4/1959 | Chrystman | |
| 2,960,063 A * | 11/1960 | Martuch | B05C 3/15 |
| | | | 264/301 |
| 3,627,601 A | 12/1971 | Hayes et al. | |
| 3,676,258 A | 7/1972 | Jackson | |
| 3,681,039 A * | 8/1972 | Marzocchi | C03C 25/20 |
| | | | 427/350 |
| 3,741,153 A | 6/1973 | Sears et al. | |
| 3,769,126 A | 10/1973 | Kolek | |
| 3,874,329 A * | 4/1975 | McLarty | B29C 53/8066 |
| | | | 118/DIG. 18 |
| 3,951,631 A | 4/1976 | Fulk | |
| 3,977,854 A | 8/1976 | Fulmer et al. | |
| 4,101,695 A | 7/1978 | Batts | |
| 4,267,007 A | 5/1981 | Kellogg | |
| 4,733,630 A * | 3/1988 | Sugimoto | B05C 11/021 |
| | | | 118/109 |
| 4,775,434 A * | 10/1988 | Rolston | B05C 3/15 |
| | | | 57/352 |
| 9,623,437 B2 * | 4/2017 | Tibor | B29C 48/705 |
| 2019/0176365 A1 * | 6/2019 | Meyer | B29B 15/125 |
| 2019/0231606 A1 * | 8/2019 | Andrews | B29C 65/08 |
| 2021/0086405 A1 * | 3/2021 | Meyer | B29B 15/122 |

FOREIGN PATENT DOCUMENTS

| | | | |
|---|---|---|---|
| FR | 2061526 | 6/1971 | |
| JP | 07276514 | 10/1995 | |
| JP | 0880576 | 3/1996 | |
| JP | 0925141 | 1/1997 | |
| WO | WO-2018036790 A1 * | 3/2018 | B29B 15/125 |

\* cited by examiner

APPARATUS AND METHOD FOR CONTROLLING A QUANTITY OF BINDER RESIN THAT FOLLOWS A THREAD

CROSS-REFERENCE TO RELATED APPLICATIONS

This application is the U.S. national stage application of International Application PCT/NO2019/050206, filed Oct. 4, 2019, which international application was published on Apr. 9, 2020, as International Publication WO 2020/071923 in the English language. The International Application claims priority of Norwegian Patent Application No. 20181287, filed Oct. 5, 2018. The international application and Norwegian application are both incorporated herein by reference, in entirety.

The invention relates to an apparatus and a method for controlling a quantity of binder resin carried by a thread. The apparatus may be referred to as a resin regulator arranged to control a quantity of binder resin carried by a fibre thread.

THE PRIOR ART AND THE DRAWBACKS THEREOF

When forming a laminate, for example a hollow fibreglass mast, a technique known as filament winding is used. A fibre thread with binder resin applied to it is laid on a rotating mandrel by means of a filament winder which is moved back and forth parallel to a rotational axis of the mandrel. The rotational speed of the mandrel and the moving speed of the filament winder are adjustable. By changing the speed-ratio of the mandrel and filament winder, it is possible to adjust the amount of fibre thread that is being laid on the mandrel and that it is possible to lay on the mandrel in a radial direction and in an axial direction. The fibre thread used for this is generally referred to as a filament as the fibre thread is formed of a plurality of smaller threads. For example, a fibre-thread filament with a diameter of 4 millimetres may be formed of several thousand fibre threads.

The function of the binder resin is to bind the fibre threads together and give strength to the hollow fibreglass mast as the resin cures after the fibre thread and the binder resin have been applied to the mandrel. The portion of binder resin is often stated in percent by weight of a final laminate weight and may, for example, be between 25% and 27%. For example, a fibreglass mast weighing 100 kg will be formed from 75 kg of fibre thread and 25 kg of binder resin.

The binder resin is applied to the fibre thread through an impregnation process in which the fibre thread is passed through a binder resin vessel containing a liquid binder resin. It is important that the fibre thread becomes saturated with binder resin to prevent dry portions in the laminate that is being produced. When the fibre thread is pulled out of the binder resin vessel, the fibre thread therefore has an excess of binder resin that must be scraped off the fibre thread. According to the prior art, the scraping may be done, for example, by pulling the fibre thread through a scraper die, or through a passive, flat scraper comprising an upper plate and a lower plate, or between two rotating rollers, or by a combination of said techniques.

Patent document U.S. Pat. No. 3,741,153 discloses an apparatus for applying a liquid to linear elements such as glass yarns and strands, from which a binder resin of superfluous material is removed by means of a scraper which is fixedly arranged in the apparatus.

Patent document U.S. Pat. No. 4,775,434 discloses a resin-stripping die which is used for evenly removing superfluous resin material from threads in filament-winding processes for resin-impregnated threads, the dies having conically shaped passages.

Prior-art scrapers have several problems:

The fibre threads are joined by a knot, and if the knot is too large, the thread may break when the knot passes the scraper.

When the thread is saturated with binder resin, an excess of the binder resin will run off the fibre thread between the filament winder and the mandrel. The binder resin that runs off the fibre thread is to be regarded as waste, and results in loss of an expensive raw material.

The saturation of the binder resin in the fibre thread is affected by the temperature, thread speed, thread quality and type of binder resin. It may therefore be difficult to maintain a constant laminate weight when one or more of said factors are changed.

For a constant amount of filament to be added on a conical mandrel, the rotational speed of the mandrel is adjusted. In practice, this results in increased production time and increased costs.

Solutions that can reduce the loss of binder resin and simultaneously make the production of laminate more efficient are therefore sought.

The invention has for its object to remedy or to reduce at least one of the drawbacks of the prior art or at least provide a useful alternative to the prior art.

The object is achieved through the features that are specified in the description below and in the claims that follow.

A GENERAL DESCRIPTION OF THE INVENTION

The invention is defined by the independent claims. The dependent claims define advantageous embodiments of the invention.

In a first aspect, the invention relates to an apparatus for controlling a quantity of binder resin carried by a thread, the apparatus comprising a first tine holder with a first tine set and a second tine holder with a second tine set. Each of the tine sets comprises at least one tine row, each tine row comprising at least two tines with centre axes. The first tine set and the second tine set are arranged parallel and displaceably to each other in an axial direction. In a neutral position, the tine sets form a rectilinear guide track for the thread, and, in a displaced position, they form an angular guide track.

In the technical terminology, the apparatus is referred to as a binder resin regulator. The thread may be a filament. The thread may be a fibre thread. By a tine holder may be understood, herein, a device arranged to hold at least one tine. Two adjacent tines in a tine row form a thread passage. Said two adjacent tines may be referred to as a tine pair. The thread passage may have a width that creates space between the thread and the adjacent tines so that the thread does not come into contact with the tines if there is a small buckle in the thread or if the tine rows have become slightly displaced.

The apparatus may comprise a plurality of thread passages. The number of thread passages may be equal to the number of threads that are being wound on a mandrel, for example 16. More than one thread may be pulled through one thread passage. The tine rows may advantageously be arranged perpendicularly to the thread.

By an axial direction may be understood, herein, the longitudinal direction of the tine holder and the tine rows.

By a rectilinear guide track may be understood that the thread passes through the apparatus in a straight line. By an angular guide track may be understood that the thread does not pass through the apparatus in a straight line.

The effect of changing the guide track the way described herein is that the binder resin may be scraped off the thread in a controlled and adjustable way, in order thus to optimize the quantity of binder resin carried by the thread to the mandrel.

The effect of the apparatus comprising at least two tine rows is that the thread may be scraped on two sides as a scraping on two sides gives a more homogenous scraping and better distribution of the remaining binder resin than if the thread is scraped on only one side.

The viscosity of the binder resin may be affected by the temperature and the thread quality. By the scraping being controllable as described by the invention, it is possible to keep the quantity of binder resin carried by the thread to the mandrel constant, even if the viscosity, temperature and thread quality vary.

The rectilinear guide track may be formed when the tine sets are in a neutral position. The thread can then pass through the apparatus without coming into contact with any tines, so thereby no binder resin is scraped off.

By displacing at least one tine set, an angular guide track may be provided, as a tangential contact surface is created between the thread and at least one tine. This contact surface functions as a scraper for the binder resin. The contact surface increases with increasing displacement of the tine row. Maximal scraping is achieved when the tine row is maximally displaced.

The centre axes of tines belonging to the same tine row may be parallel. The centre axes may be perpendicular to a plane formed by a plurality of threads.

The effect of tines belonging to the same tine row being parallel is that a plurality of threads that pass through the apparatus will have identical guide tracks and thereby have equal scraping. By the centre axes being arranged perpendicularly to a plane formed of several threads, the threads may pass the tines identically.

The first tine set and the second tine set may together comprise at least three tine rows arranged alternately in the first tine set and in the second tine set.

The effect of an alternate arrangement of the tine rows in the first tine set and in the second tine set is that the thread will alternately get the binder resin scraped off on a first side and a second side.

In addition to a better scraping, such alternate contact may give a better distribution of the binder resin on the thread. The thread is pulled through the binder resin regulator, a tension thereby being created in the thread. If the thread is a filament with a round cross section, the tension may make the cross section of the filament take a flat and rectangular shape when the filament is pulled along the surface of the tine. By the filament being flattened, the overall surface of the filament against the tine increases. Thereby a greater proportion of threads in the filament is exposed. This increases the scraping effect, while, at the same time, the binder resin is distributed over more threads in the filament, as compared to in a filament having a round cross section. The more tines a thread is in contact with, the better the scraping and distribution of the binder resin.

The tines belonging to the first tine set may project from a first tine-holder surface, and the tines belonging to the second tine set may project from a second tine-holder surface.

The first tine-holder surface and the second tine-holder surface may be arranged in such a way that they face each other.

The effect of the first tine-holder surface and the second tine-holder surface being arranged opposite each other is that an enclosing passage may be formed for the thread through the apparatus, so that the thread maintains its course by a possible slack. The enclosing passage may also be advantageous as the thread is to be threaded, because then it may not move inadvertently. The first tine row may project upwards, whereas the second tine row may project downwards.

The first tine-holder surface may be arranged below the second tine-holder surface as the tines that are arranged in the tine-holder surfaces take vertical positions.

Further, opposite arrangements of the tine rows may give a simple design of the tine holders as each of the first and second tine holders may form a rectangular and simple shape.

The first and second tine rows may be arranged in an interdigitated manner so that a distance between the tines and an opposite tine surface is smaller than the diameter of the filament. The first and the second tine rows may be of equal heights.

A second tine holder arranged over the first tine holder may be removed in order thereby to facilitate threading of the thread in that the thread may be threaded vertically instead of horizontally. When the thread has got through the first tine row, the second tine holder may be arranged over the first tine holder so that a closed passage is created for the thread.

The first tine-holder surface and the second tine-holder surface may be so arranged that they face the same way.

The effect of the first tine-holder surface and the second tine-holder surface facing the same way is that the thread may be threaded vertically without first removing one tine holder. If the first and second tine-holder surfaces are arranged in such a way that the tines project downwards, the further effect of the binder resin being able to run straight down into an underlying collecting vessel is achieved. Thereby spillage of binder resin onto the apparatus can be reduced.

If the first tine-holder surface and the second tine-holder surface are arranged in such a way that the tines project the same way, upwards or downwards, the thread may be threaded simultaneously through the first and second tine rows.

In an embodiment in which the first and second tine rows project the same way, the tine holders may comprise corresponding grooves, so that the tine holders may overlap each other in a common plane. The tine holders may then, for example, be shaped like an E.

One of the tine sets may be displaceable and the other one of the tine sets may be non-displaceable.

The effect of one tine set being displaceable, while the other tine set may be fixed, or non-displaceable, is that the structure of the apparatus may be made simpler than if both tine sets are displaceable.

In an embodiment in which the tine rows project in opposite directions, the first and lower tine set may advantageously be fixed.

The apparatus may include an actuator for displacing at least one of the tine sets. The actuator may for example be a linear actuator or, preferably, a rotatable actuator.

Accordingly, the displacement of at least one of the tine sets may be provided by a rotatable actuator.

The effect of a rotatable actuator is that a rotatable actuator may be made more compact than a linear actuator, for example a cylinder. The rotatable actuator may be a rotatable cam disc. The rotatable cam disc may have an outer diameter in which the difference between a largest diameter and a smallest diameter corresponds to a maximum displacement of the at least one tine row.

The rotatable actuator may comprise an electrically operated motor with a driveshaft, and the cam disc may be arranged on the camshaft.

The cam disc may abut against a first end portion belonging to the tine holder. The tine holder may rest, at its second end portion, against a spring pressing the tine holder against the cam disc.

In an alternative embodiment, the actuator may, as mentioned above, be linear, for example a cylinder. The actuator may be driven by a fluid.

The apparatus may be connected to a programmable device arranged for an automatic displacement of at least one of the tine sets.

The effect of connecting the binder resin regulator to a programmable device is the possibility of enabling an automatic movement of at least one tine set in order thereby to provide an automatic adjustment of the scraping effect.

For example, the binder resin regulator may be programmed for a slight scraping at the beginning and at the end of the winding process, and a more substantial scraping in an intermediate portion of the winding process. Thereby the innermost and the outermost layers of fibre thread may be saturated, whereas the layers in between may have a smaller quantity of binder resin applied to them.

Further, the programmable device may be connected to sensors, for example for air temperature, binder resin temperature and thread tension. The information from these sensors and any other sensors may be used for controlling the positions of the tine rows.

In an alternative embodiment, the apparatus may comprise a sensor arranged to record the actual quantity of binder resin that is carried by the thread out of the filament winder. Thereby the positions of the tine rows may be further optimized. Such a sensor may, for example, be an optical one.

In a second aspect, the invention relates to a method for controlling a binder resin that is carried by a thread, the method comprising the step of:

a. arranging the thread transversely to a first tine set comprising at least one tine row and a second tine set comprising at least one tine row, the first tine set and the second tine set being arranged parallel and displaceably to each other in an axial direction, and the tine sets, in a neutral position, forming a rectilinear guide track for the thread.

By at least one first tine row being arranged parallel and displaceably to at least one second tine row is meant herein that a relative displacement between the first and second tine rows is possible. One or both tine rows may be displaceable.

A method for controlling a binder resin that is carried by a thread, wherein the method may further comprise the step of:

b. displacing at least one tine set in order thereby to form an angular guide track for the thread.

The angular guide track described herein may also be described as a toothed guide track, as a portion of the guide track forms a plurality of straight guide segments between a plurality of tines. The angle between the guide segments of the plurality can be changed when at least one tine set is displaced.

A method for controlling a binder resin that is carried by a thread, wherein the method may further comprise the step of:

c. connecting the apparatus to a programmable device; and d. programming the apparatus in such a way that at least one tine set is displaced in accordance with a programmed sequence.

The effect of being able to program the apparatus in such a way that at least one tine set is displaced in accordance with a programmed sequence is that the quantity of binder resin applied to the thread may be controlled automatically through the filamenting process. By controlling the quantity of binder resin carried by the thread, the consumption of binder resin may be reduced, and the filamenting process may be made more efficient.

The programmed sequence may comprise at least one logarithm arranged to provide an automatic displacement of at least one of the tine rows based on signals from at least one sensor.

By, for example, measuring the temperatures of the air and the binder resin, and the viscosity of the binder resin, the apparatus may automatically adjust the tine sets and thereby how much binder resin will be carried by the thread.

The programmed sequence may comprise a sensor, which measures the actual quantity of binder resin carried by the thread.

EXEMPLARY EMBODIMENT

In what follows, an example of a preferred embodiment is described, which is visualized in the accompanying drawings, in which.

Figure 1:
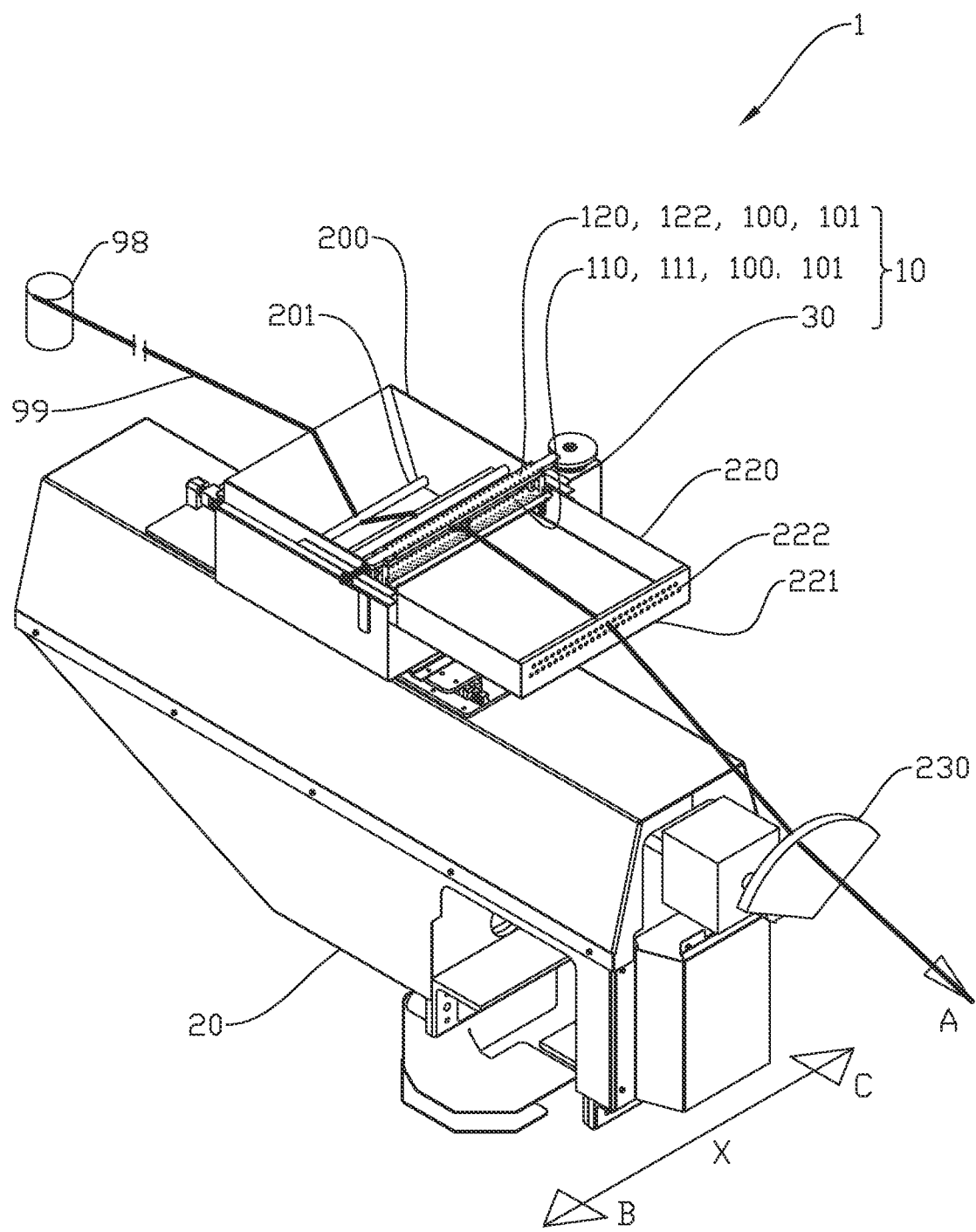
FIG. 1 shows a binder resin regulator arranged on a filament winder, in perspective.

FIG. 1 shows a filament winder 1 comprising a slide 20 with a binder resin regulator 10, a binder resin vessel 200, a collecting vessel 220 and a mandrel-thread guide 230. The slide 20 is moved alternately in a direction B and in an opposite direction C parallel to the centre axis of a rotating mandrel (not shown).

A thread 99 is carried from a reel 98 into the binder resin vessel 200, where a binder resin is added to the thread 99. A plurality of guide rollers 201 form a guide track for the thread 99 through the binder resin vessel 200 so that the thread 99 becomes saturated with binder resin. Then the thread 99 is passed through the binder resin regulator 10. The collecting vessel 220 is arranged under and after the binder resin regulator 10 and collects binder resin that is scraped off or that runs off the thread 99. The collecting vessel 220 comprises an end portion 221 provided with an outward thread guide 222. From the outward thread guide 222, the thread 99 is directed to the mandrel-thread guide 230. The thread 99 is pulled in a direction A when the mandrel is rotating as the thread 99 has been attached to the mandrel.

Figure 2:
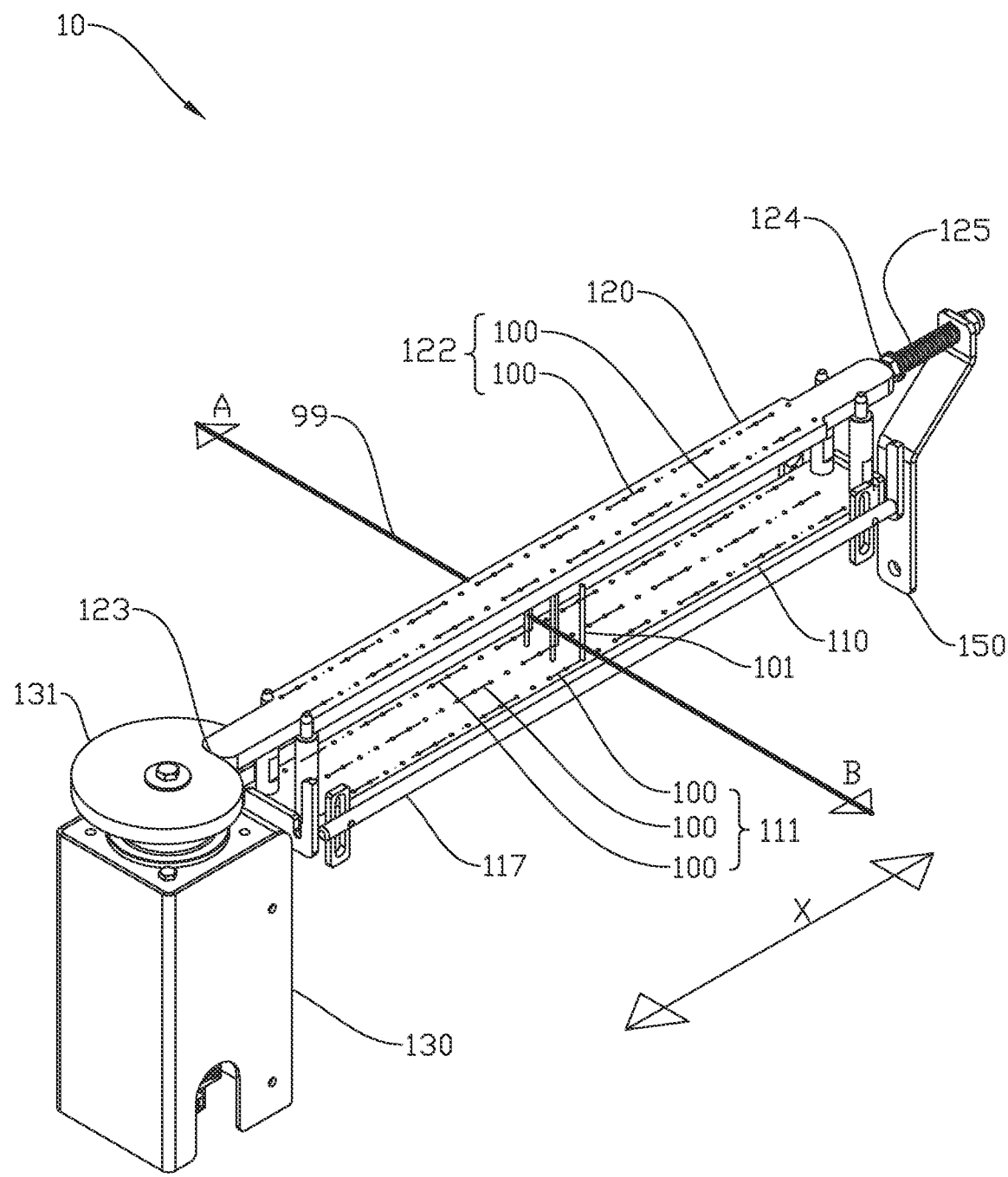
FIG. 2 shows the binder resin regulator shown in FIG. 1, on a larger scale.
Figure 3:
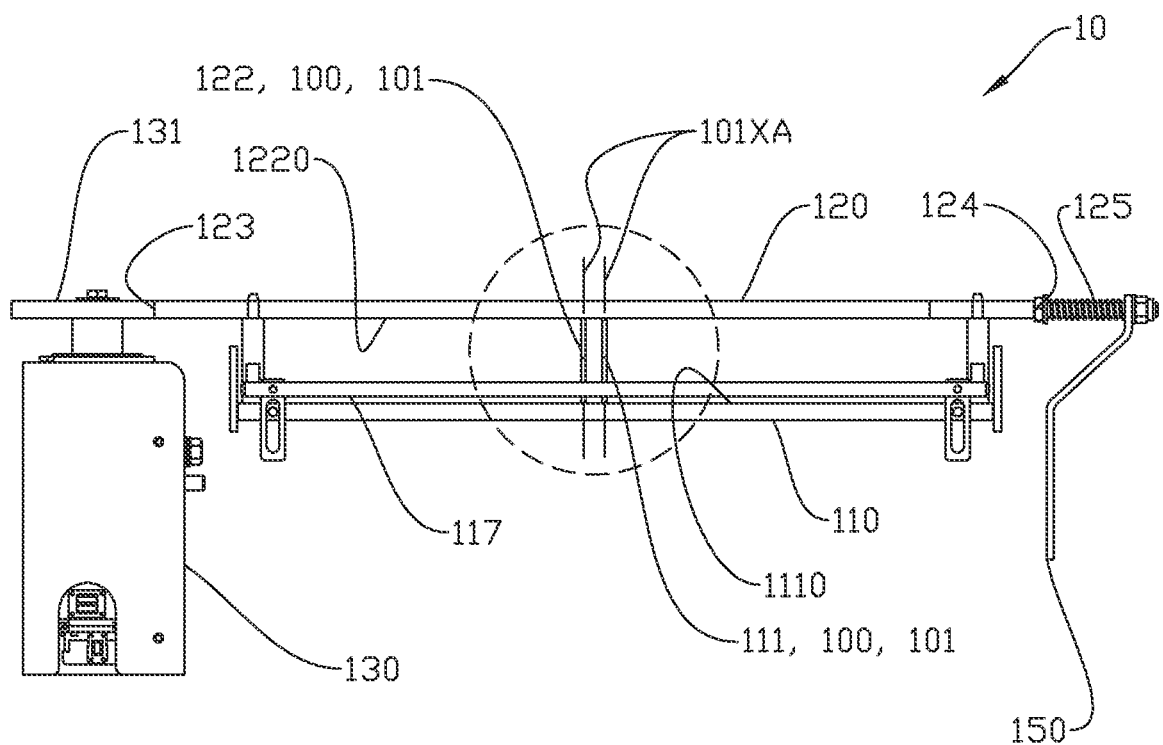
FIG. 3 shows the binder resin regulator of FIG. 2 from the front.
Figure 4:
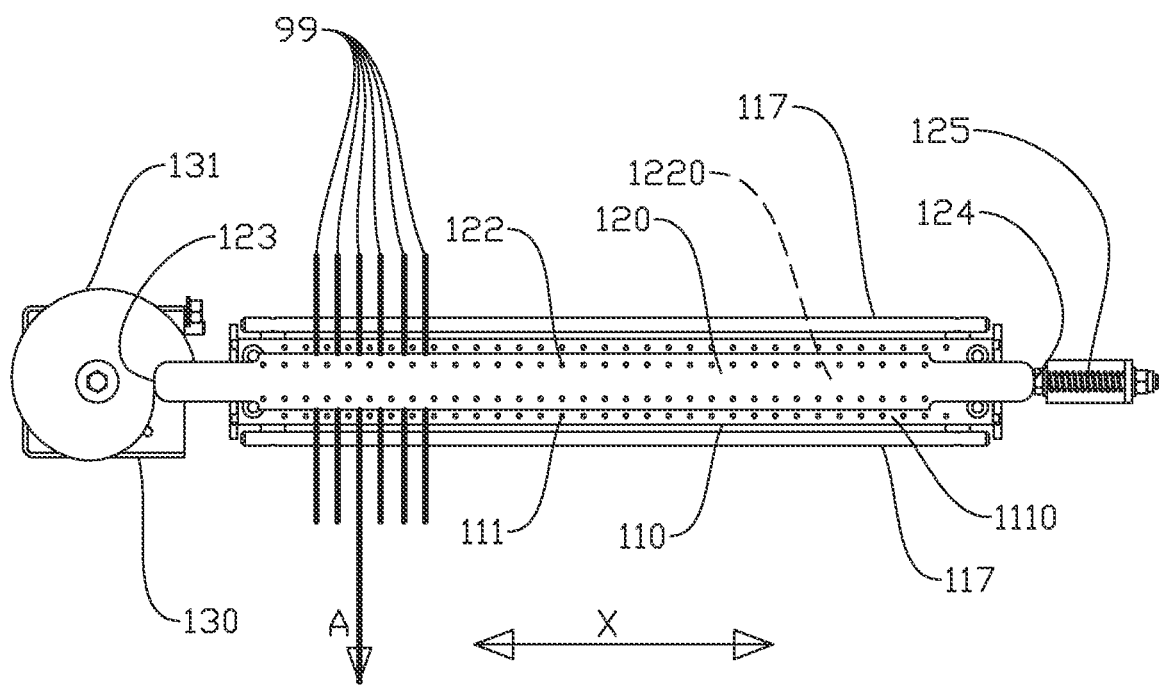
FIG. 4 shows the binder resin regulator of FIG. 2 from above.
Figure 5:
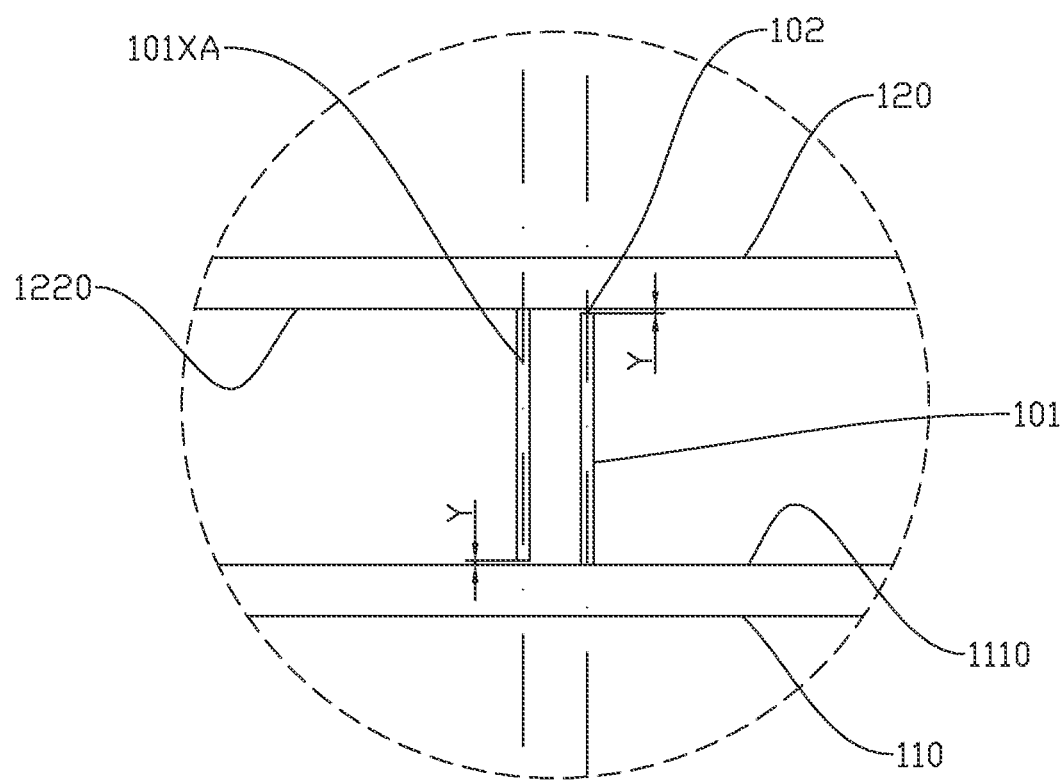
FIG. 5 shows a section of FIG. 3 on a larger scale.

FIGS. 2-4 show one embodiment of the binder resin regulator 10. A detailed and simplified section of FIG. 3 is shown in FIG. 5. The thread 99 may be carried through the binder resin regulator 10 in a direction A or in a direction B as shown in FIG. 2.

The binder resin regulator 10 comprises a frame 150 connecting the binder resin regulator 10 to the slide 20 shown in FIG. 1. The binder resin regulator 10 includes a first tine holder 110 with a first tine set 111 and a second tine holder 120 with a second tine set 122. The first tine set 111 is shown with three tine rows 100. The second tine set is shown with two tine rows 100. Each tine row 100 is shown with 32 tines 101 having even spacing and equal lengths. The tines 101 have end faces 102 (shown in FIG. 5) and centre axes 101XA (see FIG. 3). The centre axes 101XA of the tines 101 are parallel.

The tines 101 belonging to the first tine set 111 project from a first tine-row surface 1110. The tines 101 belonging to the second tine set 122 project from a second tine-row surface 1220. The two tine-row surfaces 1110, 1220 are arranged opposite each other and with an interspace that gives a clearance Y (FIG. 5) between the end faces 102 of the tines 101 and the respective, opposite tine-row surfaces 1110, 1220. The tine rows 100 are arranged perpendicularly to the guiding direction A of the thread 99 and may be displaced in an axial direction X. The guiding direction A is arranged perpendicularly to the axial direction X.

Figure 6:
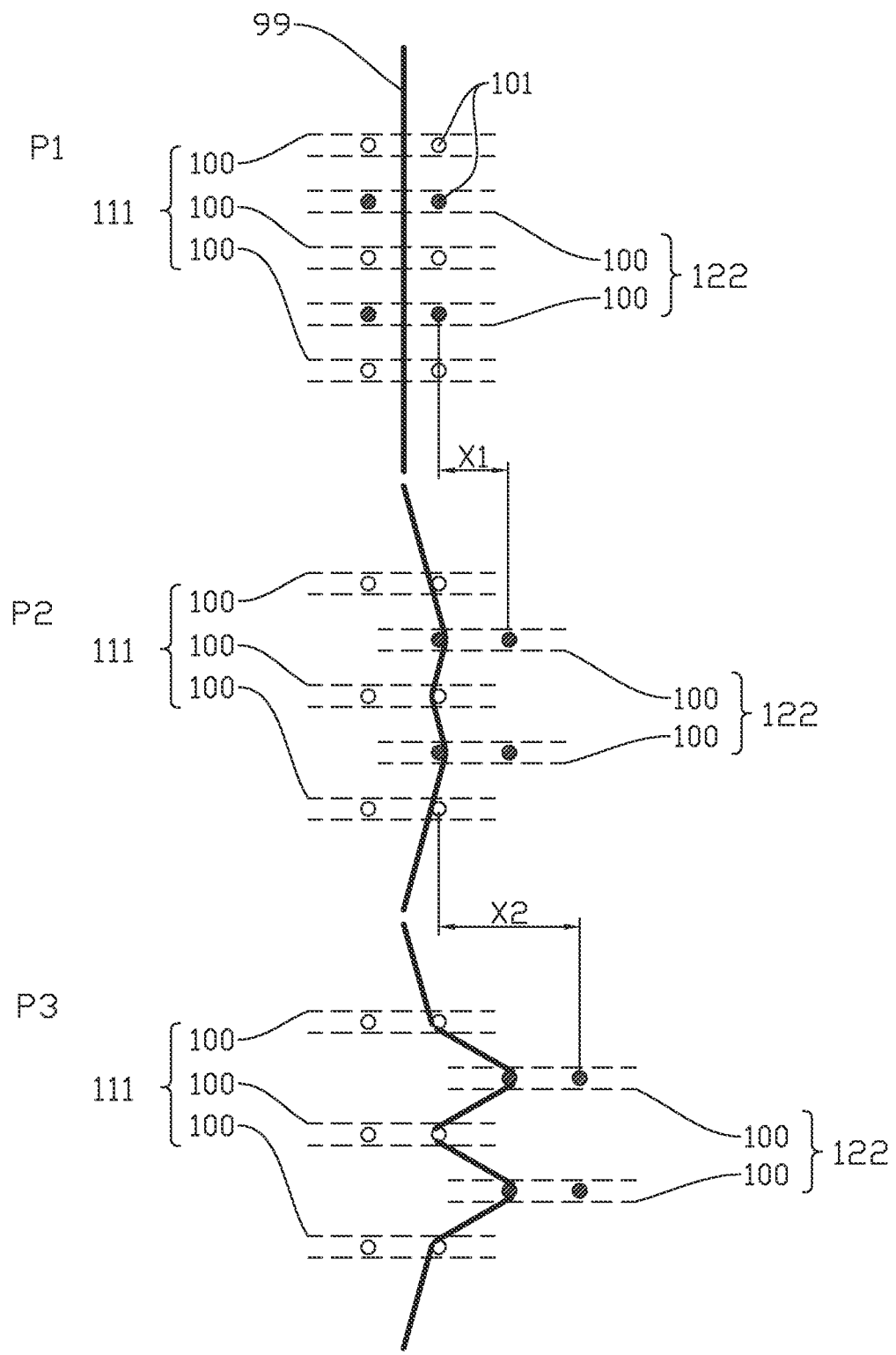
FIG. 6 shows a principle drawing of different guide tracks for a thread.

The binder resin regulator 10 comprises an actuator 130. The actuator 130 is provided with a rotatable cam disc 131. A first end 123 of the second tine holder 120 abuts against the cam disc 131. A second end 124 of the second tine holder 120 rests against a compression spring 125 which presses the second tine holder 120 against the cam disc 131. When the cam disc 131 is rotated, the second tine holder 120 and the second tine set 122 will be displaced in a direction X so that the guide track for the thread 99 through the binder resin regulator 10 is changed, as shown in FIG. 6. In front of and behind the tine sets 111, 122, a guide shaft 117 is arranged, adapted for holding the thread 99 at a constant, vertical distance between the first tine holder 110 and the second tine holder 120.

FIG. 6 shows how the guide track of the threads 99 changes when the second tine set 122 is displaced relative to the first tine set 111. In a position P1, the tine sets 111, 122 are in a neutral position, so that a rectilinear guide track is formed for the thread 99. The guide track is perpendicular to the tine sets 111, 122.

In a position P2, the second tine set 122 is offset by a distance X1 relative to the neutral position, so that the thread 99 touches a plurality of tines 101 as an angular guide track is formed for the thread 99. The slightly angular guide track shown in the position P2 gives a medium scraping effect for the binder resin.

In a position P3, the second tine set 122 is offset by a distance X2 relative to the neutral position. Here, the guide track forms a maximally angular guide track for the maximum scraping effect.

The rotatable cam disc 131 shown in FIGS. 1-4 is arranged to give a continuous displacement of the second tine set 122.

Figure 7:
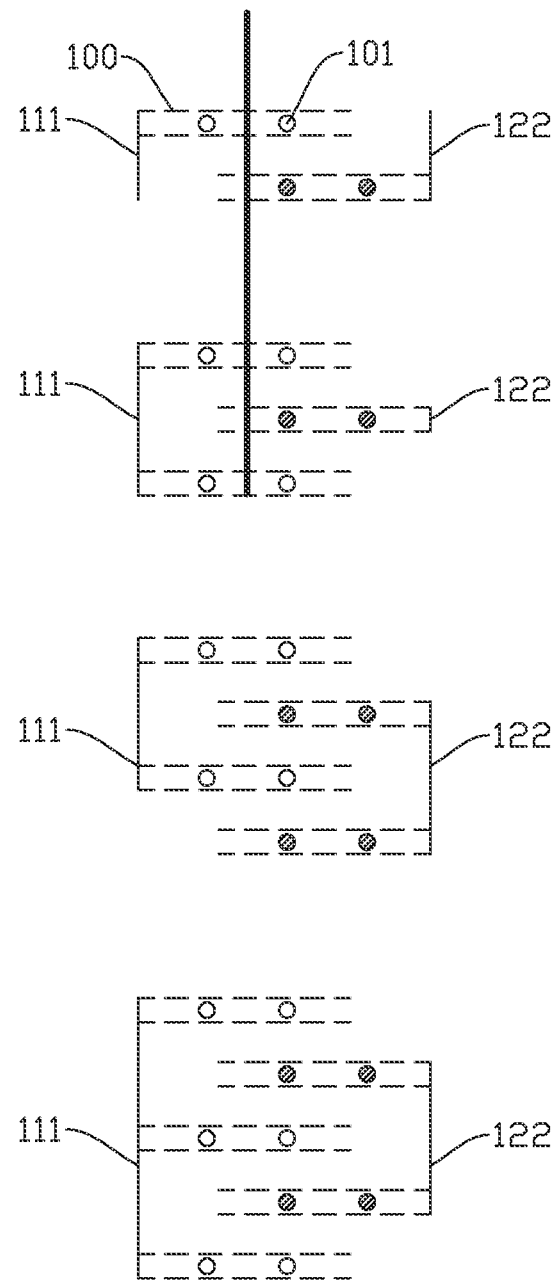
FIG. 7 shows a principle drawing of how different numbers of tine rows may be arranged.

FIG. 7 shows the first tine set 111 and the second tine set 122 with two, three, four and five tine rows 100 in total. With three or more tine rows 100, the tine rows 100 are arranged alternately in the first tine set 111 and in the second tine set 122, as the figure shows.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. An apparatus arranged to control a quantity of binder resin that is carried by a thread, wherein the apparatus comprises:
   a first tine holder with a first tine set;
   a second tine holder with a second tine set;
   each of the tine sets comprising at least one tine row, and each tine row comprising at least two tines with center axes, the first tine set and the second tine set being arranged parallel and displaceably to each other in an axial direction, and the tine sets, in a neutral position, forming a rectilinear guide track for the thread and, in a displaced position, forming an angular guide track for the thread.

2. The apparatus according to claim 1, wherein center axes of tines belonging to the same tine row are parallel.

3. The apparatus according to claim 1, wherein the first tine set and the second tine set together comprise at least three tine rows which are placed alternately in the first tine set and in the second tine set.

4. The apparatus according to claim 1, wherein the tines belonging to the first tine set project from a first tine-holder surface and the tines belonging to the second tine set project from a second tine-holder surface.

5. The apparatus according to claim 4, wherein the first tine-holder surface and the second tine-holder surface are arranged in such a way that they face each other.

6. The apparatus according to claim 4, wherein the first tine-holder surface and the second tine-holder surface are arranged in such a way that they face the same way.

7. The apparatus according to claim 1, wherein one of the tine sets is displaceable and the other one of the tine sets is not displaceable.

8. The apparatus according to claim 1, wherein the apparatus includes a rotatable actuator, and wherein the displacement of at least one of the tine sets is provided by the rotatable actuator.

9. The apparatus according to claim 1, wherein the apparatus is connected to a programmable device arranged for an automatic displacement of at least one of the tine sets.

10. A method for controlling a quantity of binder resin that is carried by a thread, wherein the method comprises the step of:
   a. arranging the thread transversely to a first tine set comprising at least one tine row and a second tine set comprising at least one tine row, the first tine set and the second tine set being arranged parallel and displaceably to each other in an axial direction, and the tine sets, in a neutral position, forming a recti-linear guide track for the thread.

11. The method according to claim 10, wherein the method further comprises the step of:
   b. displacing at least one tine set in order thereby to form an angular guide track for the thread.

12. The method according to claim 10, wherein the method further comprises the steps of:

c. connecting the apparatus to a programmable device; and
d. programming the apparatus in such a way that at least one tine set is displaced in accordance with a programmed sequence.

13. The method according to claim 12, wherein the programmed sequence comprises a signal from at least one sensor arranged on the apparatus, the value of the signal affecting how much the tine sets will be displaced relative to each other.

14. The method according to claim 11, wherein the method further comprises the steps of:
c. connecting the apparatus to a programmable device; and
d. programming the apparatus in such a way that at least one tine set is displaced in accordance with a programmed sequence.

* * * * *